June 9, 1925.

W. J. RAUSLER ET AL 1,540,950

WEEDER

Filed Feb. 3, 1923

Inventors
W. J. Rausler
& L. C. Puett
By Watson E. Coleman
Attorney

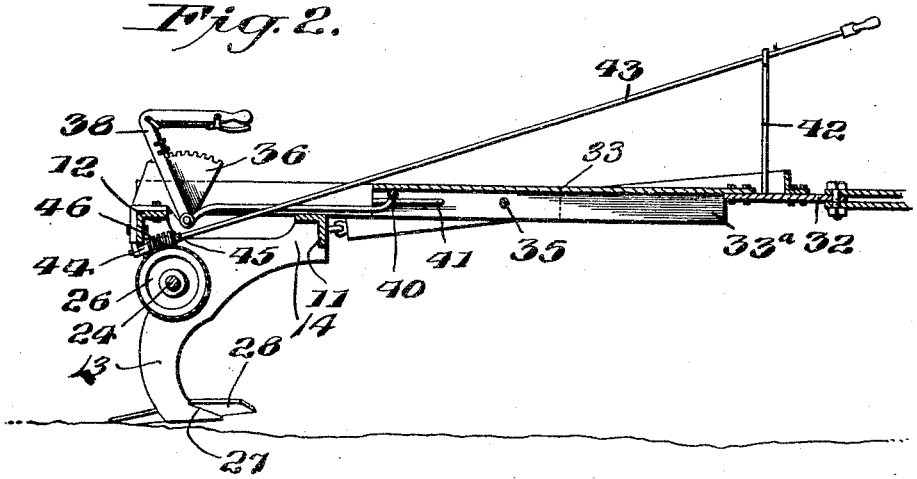
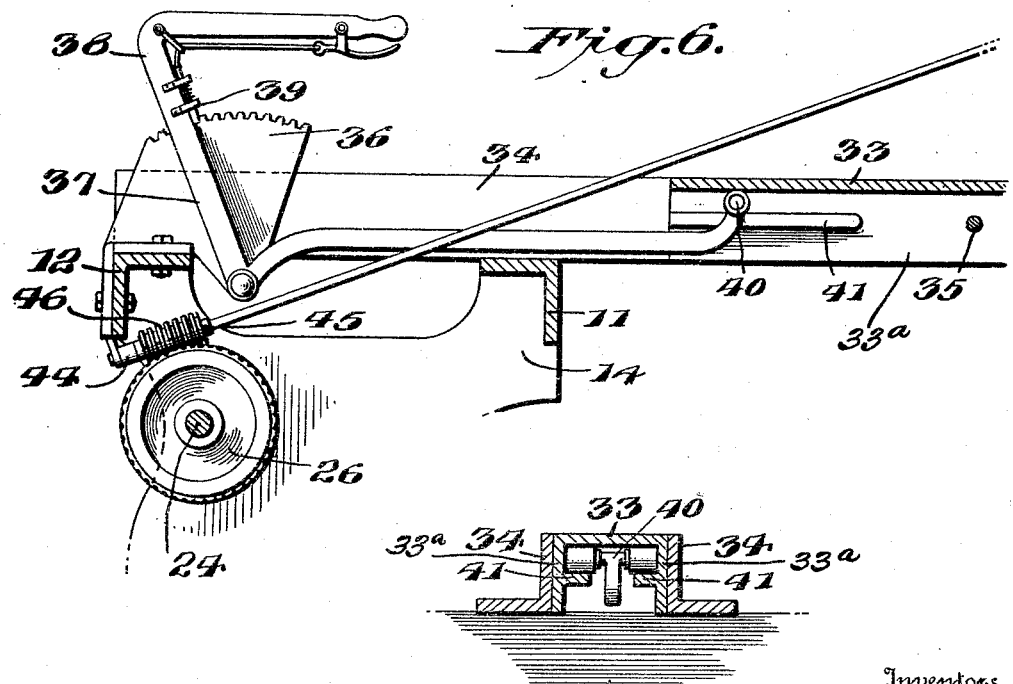

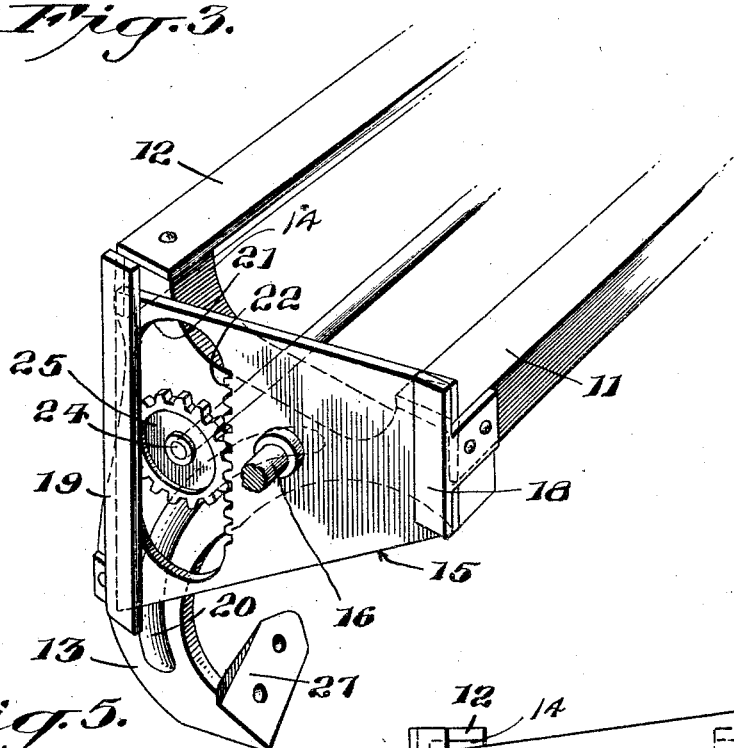
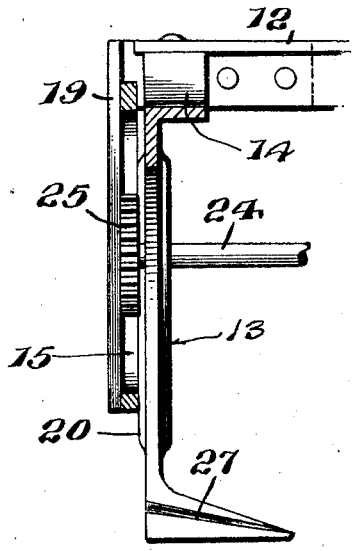
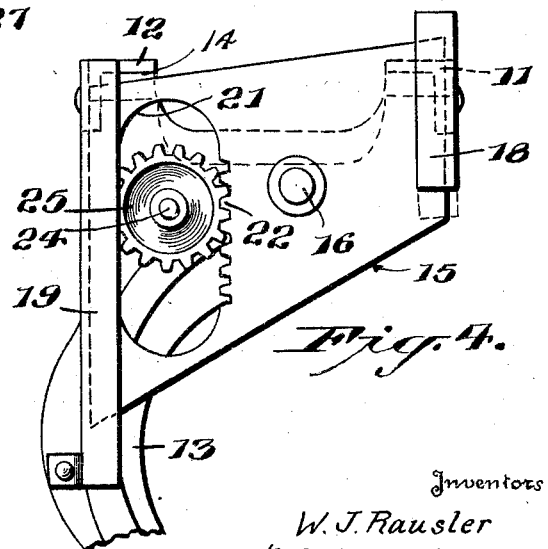

Patented June 9, 1925.

1,540,950

UNITED STATES PATENT OFFICE.

WILLIAM J. RAUSLER AND LAMAR C. PUETT, OF LOVELAND, COLORADO.

WEEDER.

Application filed February 3, 1923. Serial No. 616,728.

*To all whom it may concern:*

Be it known that we, WILLIAM J. RAUSLER and LAMAR C. PUETT, citizens of the United States, residing at Loveland, in the county of Larimer and State of Colorado, have invented certain new and useful Improvements in Weeders, of which the following is a specification, reference being had to the accompanying drawings.

This invention relates to improvements in weeders, and more particularly to that type of weeder in which the weeds are separated at or below the surface of the soil.

An important object of the invention is to provide in a device of this type a frame including rigidly mounted cutting blades together with means for tilting the cutting blades to present the same to the ground at any desired angle.

A further object of the invention is to provide in a device of the above character wherein the tilting blades are employed and where the frame is bodily tilted to accomplish this tilting of the blades, means whereby the frame may be mounted to permit vertical adjustment thereof so that the depth of the engagement of the blades may likewise be regulated.

A still further object of the invention is to provide a machine of this character by means of which the weeds may be severed below the surface and leave the surface of the soil in substantially unbroken condition so that the underlying moisture will not be dried out after a weeding operation.

An additional object of the invention is to provide a machine of this character including a plurality of rigidly mounted blades so constructed and positioned that they are in effect a single continuous blade cutting through a continuous path the width of the machine.

These and other objects we attain by the construction and arrangement shown in the accompanying drawings wherein for the purpose of illustration is shown a preferred embodiment of our invention and wherein like reference characters designate like parts throughout.

In the drawings:—

Figure 2 is a transverse sectional view taken centrally thereof;

Figure 3 is a perspective of the end of the frame showing the lift castings and the mounting thereof;

Figure 4 is an end elevation illustrating the vertical adjustment of the frame upon the lift plate;

Figure 5 is a sectional view through the lift plate;

Figure 6 is an enlarged view showing the construction of the tilting mechanism; and Figure 7 is a detail sectional view showing the engagement of the tilting lever with the hitch frame.

Figure 1:
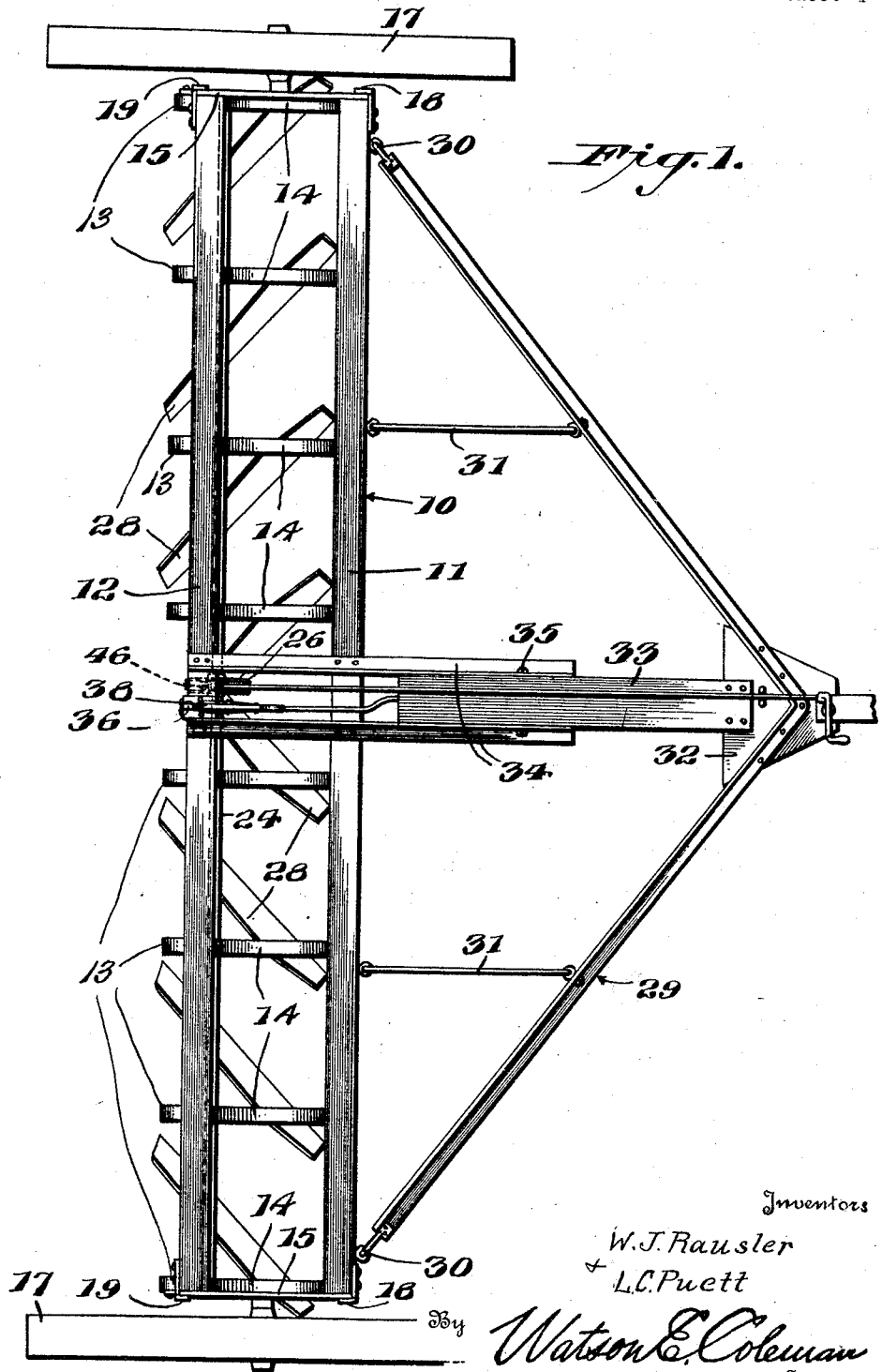
Figure 1 is a plan view of a weeder constructed in accordance with our invention.

Referring now more particularly to the drawings, the numeral 10 indicates a main frame comprising a pair of parallel transversely extending angle bars 11 and 12 held in spaced relation by means of blade holders 13 embodying attaching portions 14 spaced longitudinally of the machine and each secured to one of the transversely extending bars 11 and 12. The numeral 15 designates lift castings mounted upon the ends of the main frame 10 and held against rotation with relation thereto but permitting vertical adjustment of the main frame thereon. These lift castings form a mounting for stub axles 16 upon which the supporting wheels 17 of the device are mounted.

Each lift casting 15 comprises a plate in the form of a trapezoid, the vertical edges thereof being parallel and coacting with combined guiding and retaining elements 18 and 19 carried by ends of the transverse frame members 11 and 12 respectively. The guide member 18 is wholly supported by the frame member 11 whereas the guide member 19 is secured at its upper end to the frame member 12 and at its lower end to the next adjacent blade holder 13. The blade holders 13 are provided upon opposite sides thereof with reinforcing ribs 20, and the inner faces of the lift castings 15 abut against the reinforcing ribs upon the adjacent sides of the next adjacent blade holders 13 and against the ends of the frame members 11 and 12, thus supplying a three point suspension therefor.

Each lift casting 15 has formed therein an opening 21, one edge of which is flanged and provided with internal gear teeth, as indicated at 22. The blade holders 13 have formed therein aligned openings in which is rotatably mounted a shaft 24, the ends of which project into the flanged openings of the lift castings 15 and are there provided with pinions 25 meshing with the rack formed by the teeth 22. This shaft is provided substantially at the center of the frame with a worm gear 26. It will be seen that upon rotation of the worm gear 26 the pinions 25 will be rotated and by their engagement with the racks 22 will cause relative vertical movement of the frame 10 and lift casting 15. Since the weight of the frame 10 is borne by the lift casting 15 through the wheels 17, the frame 10 will be raised or lowered dependent upon the direction of rotation of the shaft.

Each blade holder 13 has formed upon the lower end thereof an angularly disposed blade seat 27, which blade seat is at an angle both to the ground and to the direction of travel of the weeder. The blades 28 which are applied to these blade seats are of sufficient length that the forward edge of each blade overlies the adjacent rearward edge of the next adjacent blade so that a continual swath is cut by the blades across the width of the machine. In applying the blade holders and blades to the device, right and left hand blade holders will be provided so that the blades at each side of the machine will be directed in a common direction, thus preventing side thrust being placed upon the machine by the blades during their cutting operation.

The numeral 29 designates a hitch member comprising a substantially V-shaped rigid frame, the arms of which diverge rearwardly and are pivotally connected to the forward cross member 11 of the frame 10, as indicated at 30. These arms are connected at points intermediate their ends with the cross member 11 by means of links 31, thus rigidifying the arms and providing a further pivotal connection between the same and frame. The hitch includes a plate 32 adapted to be connected to the hitch member of the tractor in any desired manner, this plate having secured thereto a rearwardly directed member 33 formed of an inverted channel iron. A pair of angle bars 34 have their forward ends pivotally connected to the member 33 intermediate its ends by a bolt 35 extending through the angle bars and through the flanges of the member 33; the rear ends of these angle bars being rigidly connected to the members 11 and 12 of the frame 10. Mounted upon the frame 10 intermediate the angle bars 34 is a segment 36 to which is pivoted a bell crank lever 37, one arm 38 of which bears a spring latch 39 of any suitable construction for coaction with the segment to hold the lever in adjusted position.

The opposite arm of the lever 37 is provided at its end with a cross head 40 operating within the rear end of the channel of the channel iron member 33 and held against downward movement within this channel by means of stop plates 41 secured to the inner faces of the flanges 33ª of the member.

It will be seen that upon adjustment of the lever 37 about its pivot the rear end of the channel iron member 33 will be elevated or lowered as the case may be and the forward end of the hitch member depressed or elevated. Since the hitch member is attached to the drive appliance and a pull is exerted upon this hitch member, it will follow that the frame 10 will have the resulting angular change of position placing the blades 28 at a greater or less angle to the ground as the case may be. Extending upwardly from the plate 32 of the hitch member is a support 42, the upper end of which rotatably receives the forward end of a shaft 43, the rear end of which is mounted in spaced bearings 44 and 45 rigidly carried by the frame 10. Intermediate these bearings the shaft 43 is provided with a worm 46 meshing with the worm gear 26 and providing means whereby this gear and the shaft 24 may be rotated and held in adjusted position.

From the foregoing it will be seen that the frame 10 and accordingly the blades 28 may be vertically adjusted or angularly adjusted and at the same time an extremely simple and durable construction is provided. It will, of course, be obvious that some changes and modifications in the structure hereinbefore set forth are possible and we accordingly do not limit ourselves to the specific structure thereof except as hereinafter claimed.

We claim:—

1. In a device of the type described, supporting wheels, plates bearing stub axles for said supporting wheels; a frame including vertically disposed guide members slidably receiving the sides of said plates; blade holders rigidly connected to said frame member and having aligned apertures formed therein, a shaft directed through the apertures of the blade holders and having its end extending into openings formed in said plates, one side wall of the openings of the plates being formed to provide a rack, pinions carried by the ends of the shaft and engaging the racks of the plates, and means for rotating said shaft and maintaining the same in adjusted position.

2. In a device of the type described, supporting wheels, plates bearing stub axles for said supporting wheels; a frame including vertically disposed guide members slidably receiving the sides of said plates; blade holders rigidly connected to said frame member and having aligned apertures formed therein, a shaft directed through the apertures of the blade holders and having its end extending into openings formed in said plates, one side wall of the openings of the plates being formed to provide a rack, pinions carried by the ends of the shaft and engaging the racks of the plates, and means for rotating said shaft and maintaining the same in adjusted position, including a worm wheel secured to said shaft and a worm engaging said wheel, and a hand lever for rotating said worm.

In testimony whereof we hereunto affix our signatures.

WILLIAM J. RAUSLER.
LAMAR C. PUETT.